United States Patent [19]

Jones

[11] Patent Number: 5,029,309
[45] Date of Patent: Jul. 2, 1991

[54] PHOTOGRAPHIC EXPOSURE CONTROL APPARATUS AND METHOD

[76] Inventor: Aaron Jones, 3 Vaquero Rd., Santa Fe, N. Mex. 87505

[21] Appl. No.: 508,057

[22] Filed: Apr. 11, 1990

[51] Int. Cl.[5] .................. G03B 15/02; G03B 11/00
[52] U.S. Cl. ............................ 354/129; 354/266; 354/290; 354/295; 362/17
[58] Field of Search ............ 354/129, 131, 133, 146, 354/149.1, 413, 414, 415, 266, 267.1, 440, 456, 288, 295, 290; 362/17, 32

[56] References Cited

U.S. PATENT DOCUMENTS

| | | | |
|---|---|---|---|
| 3,016,810 | 10/1957 | Oxspring et al. | 354/465 |
| 4,063,263 | 12/1977 | Krewalk, Sr. | 354/295 |
| 4,122,470 | 10/1978 | Loranger et al. | 354/295 |
| 4,310,228 | 1/1982 | Terada | 354/413 |
| 4,385,344 | 5/1983 | Gonser | 362/32 |
| 4,530,036 | 7/1985 | Conti | 362/32 |
| 4,553,193 | 11/1985 | Evans | 362/3 |
| 4,557,574 | 12/1985 | Kohno et al. | 354/288 |
| 4,755,912 | 7/1988 | Evns | 362/8 |
| 4,876,563 | 10/1989 | Ishida et al. | 354/288 |

*Primary Examiner*—W. B. Perkey
*Assistant Examiner*—Cassandra C. Spyrou
*Attorney, Agent, or Firm*—Kolisch, Hartwell, Dickinson, McCormack & Heuser

[57] ABSTRACT

A photographic exposure control apparatus includes a directable light source, and an auxiliary shutter which is located between a camera lens and a subject. The auxiliary shutter includes a housing structure which has a window therein. The window is selectively opened and closed by a blade which is movably mounted on the housing structure, which is motor driven, and which allows the housing structure to block entry of light into a camera lens when the window is closed, and to allow light into the lens when the window is open.

The method of the invention includes the steps of positioning a subject and a film-containing camera so that the subject is in the view of the camera, underexposing an image of the subject on the film, positioning an auxiliary shutter between the subject and the camera, with the auxiliary shutter in a closed condition, darkening the environment containing the subject and the camera, providing an emitted light beam which may be directed towards the subject using a light source and a fiber-optic cable which has an auxiliary shutter control button located thereon, directing the emitted light beam at the subject, opening the auxiliary shutter for a predetermined time interval with the emitted light beam directed at a particular portion of the subject, and closing the auxiliary shutter with the auxiliary-shutter control button at the end of a predetermined time interval.

23 Claims, 4 Drawing Sheets

PHOTOGRAPHIC EXPOSURE CONTROL APPARATUS AND METHOD

BACKGROUND AND SUMMARY OF THE INVENTION

The invention relates to photographic equipment, and specifically to an exposure control apparatus and method which facilitates selective exposure of a portion of photographic film from a highlighted portion of a subject being photographed.

A photographic image may be enhanced with the application of carefully controlled light to specific portions or parts of the subject being photographed. Known techniques for accomplishing such selective lighting includes multiple flash exposures directed at a specific part of the subject while the camera shutter remains open, using a flashlight type device to direct light over specific parts of the subject with the camera lens open, or using a fiber-optic cable to direct light to the subject, again, with the camera lens held open. In the preceding techniques, the light source is turned on and off as required to control light directed towards to subject.

Another technique is to open the camera shutter, block any light from entering the camera lens with a dark obstruction and periodically removing the obstruction while the light is moved over specific areas of the subject.

One skilled in the art can readily perceive that continuous switching on and off of a light source or blocking the camera lens with a hand-held opaque object requires a great deal of coordination and does not lend itself to readily repeatable results.

An object of the invention is to provide an apparatus and method for selectively exposing portions of a light-sensitive film with light reflected from a subject being photographed, and to be able to do so with predictable repeatability.

Another object of the invention is to provide an apparatus which will facilitate the aforementioned object, and which includes an auxiliary shutter which is remotely operable by the photographer who is directing light to a specific part of the subject.

A further object of the invention is to provide an apparatus which will not affect camera stability during extended, repeat exposures.

Yet another object of the invention is to provide a directable light source which may be easily manipulated by the photographer.

Still another object of the invention is to provide a connection between the direct light source and the auxiliary shutter of the invention which allows selective, remote operation of the auxiliary shutter.

Another object of the invention is to provide an auxiliary shutter with an integral timing mechanism which provides an indication of elapsed time when the auxiliary shutter is open.

The photographic exposure control apparatus of the invention includes a directable light source, and an auxiliary shutter which is located between the camera lens and the subject. The auxiliary shutter includes a housing structure which has a window therein. The window is selectively opened and closed by a blade which is movably mounted on the housing structure, which is motor driven, and which allows the housing structure to block entry of light into a camera lens when the window is closed, and to allow light into the lens when the window is open.

The method of the invention includes the steps of positioning a subject and a film-containing camera so that the subject is in the view of the camera, underexposing an image of the subject on the film, positioning an auxiliary shutter between the subject and the camera, with the auxiliary shutter in a closed condition, darkening the environment containing the subject and the camera, providing an emitted light beam which may be directed towards the subject using a light source and a fiber-optic cable which has an auxiliary shutter control button located thereon, directing the emitted light beam at the subject, opening the auxiliary shutter for a predetermined time interval with the emitted light beam directed at a particular portion of the subject, and closing the auxiliary shutter with the auxiliary-shutter control button at the end of a predetermined time interval.

These and other objects and advantages of the invention will become more fully apparent as the description which follows is read in conjunction with the drawings.

DETAILED DESCRIPTION OF THE PREFERRED EMBODIMENTS

Figure 1:
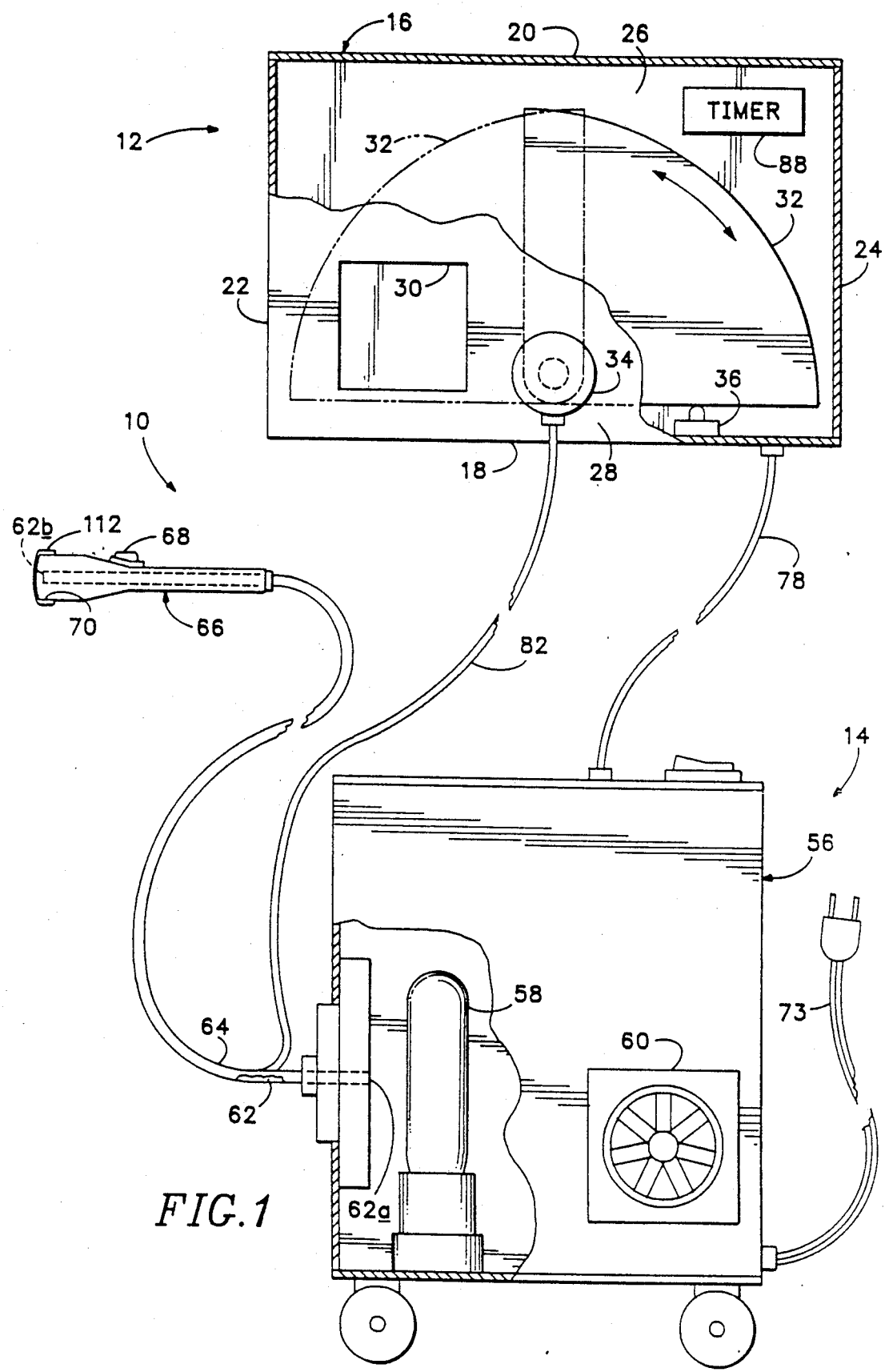
FIG. 1 is a somewhat schematic representation of the apparatus of the invention.
Figure 2:
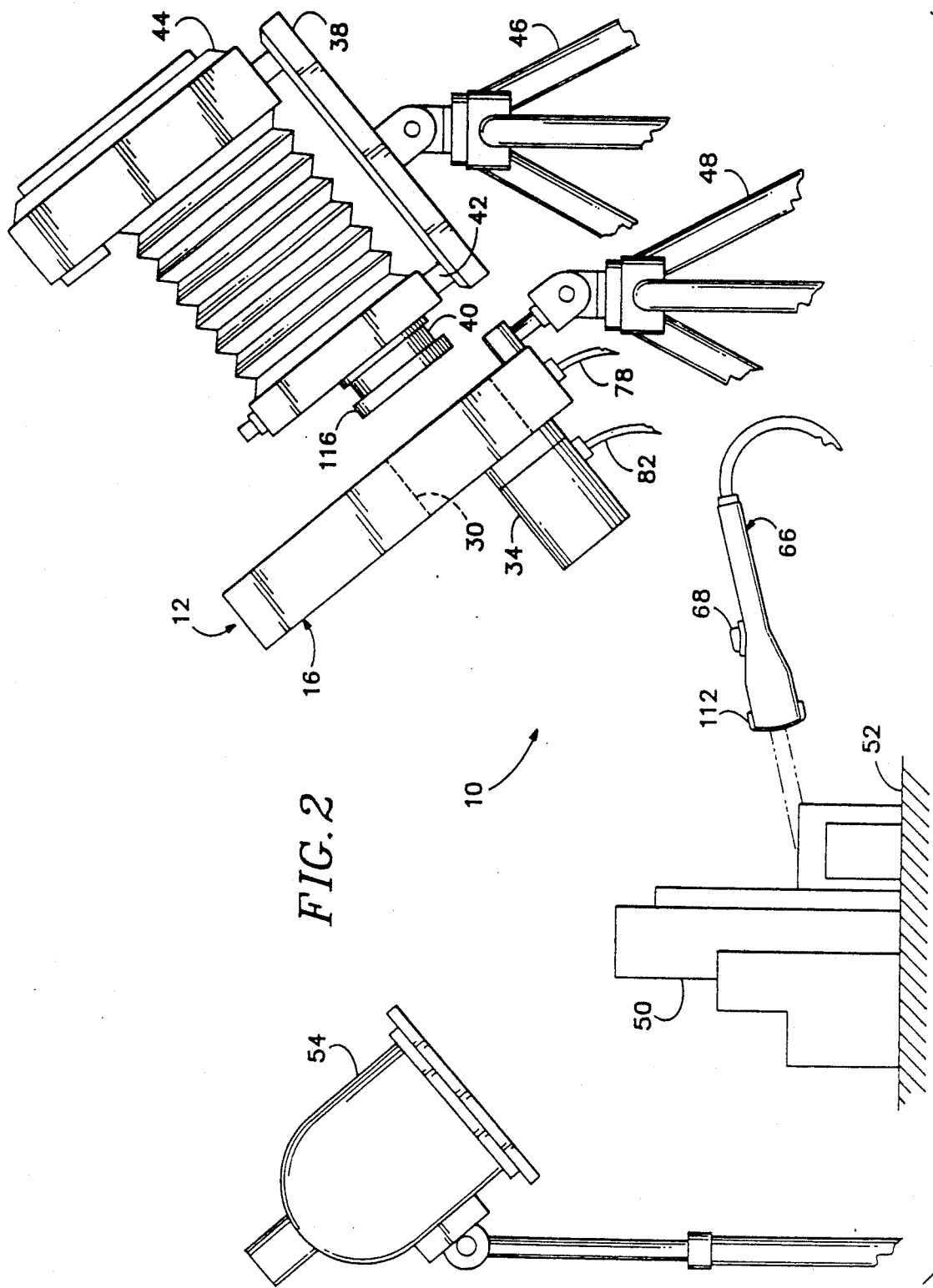
FIG. 2 is a side elevation of portions of the apparatus arranged for a photographic session.

Referring now to the drawings, and initially to FIGS. 1 and 2, the photographic exposure control apparatus of the invention is shown generally at 10. Apparatus 10 includes an auxiliary shutter, or auxiliary shutter means, shown generally at 12, and a directable light source, or directable light source means, shown generally at 14. Apparatus 10 is generally intended for use in a photo studio where lighting conditions may be closely controlled.

Auxiliary shutter 12 includes a housing structure 16, which is generally rectangular in the preferred embodiment. Housing structure 16 includes a bottom side 18, a top side 20, and spaced part ends 22, 24. An upper surface 26 is spaced from a lower surface 28 by the width, or height of the sides of the housing structure.

A window 30 is formed between the upper and lower surface of housing structure 16, and in the preferred embodiment, is rectangular in shape, with each side thereof having a dimension of approximately 5 inches. Window 30 is opened and closed by the shifting of a blade, or blade means 32, which, in the preferred embodiment, is rotatably, shiftably mounted within housing structure 16, within the confines of the sides and upper and lower surfaces. In this embodiment of the apparatus, blade 32 takes the form of a single leaf, which has a quarter-circle configuration and which is moved by a rotary solenoid, or motor, 34. Motor 34 is secured to housing structure 16 and is operable to shift blade 32 between a withdrawn condition, as depicted in solid lines in FIG. 1, and an extended position, as shown by the dashed lines in FIG. 1. A first switch 36 is provided in housing structure 16 and is closed when blade 32 reaches its fully withdrawn position. The operation of the mechanism activated by switch 36 will be described later herein.

As depicted in FIG. 2, axillary shutter 12 is used in conjunction with a camera 38, having a lens 40, a shutter release 42 and a film holder 44, containing light-sensitive, photographic film therein. Camera 38 is mounted on a camera stand 46 to hold the camera in a fixed position during the shoot.

Auxiliary shutter 12 is carried on a separate stand 48 with window 30 aligned, and close to lens 40, to enable the image of a subject 50 to pass through window 30 in an unobstructed manner. Subject 50 is placed on a stand 52 and may be illuminated by one or more flood or strobe lights, such as light 54, to provide proper subject-/camera alignment, focussing and perspective. Only one such light is depicted in FIG. 2 to simplify the drawing.

Referring back to FIG. 1, directable light source 14 includes a light-tight enclosure 56 which contains a light source 58. In the preferred embodiment, light source 58 is a projection bulb of a tungsten or daylight color balance depending on the type of film used or effect desired. Other types of light sources may be provided to achieve different effects. As may be expected, light source 58 generates heat as well as light, and for this reason, a fan 60 is provided in enclosure 56 to provide cooling air over light source 58. Enclosure 56 is provided with suitable baffles to allow the intake and exhaust of air from the interior thereof without allowing any light to be emitted from the enclosure. Enclosure 56 is mounted on casters or rollers to provide free rolling movement of the enclosure about the studio.

An elongate, fiber-optic cable 62 is connected to enclosure 56, with one end 62a thereof being located proximal to light source 58, thereby picking up light from light source 58 and conducting it along the length of the cable to the other end 62b thereof where the light is emitted. In the preferred embodiment, fiber-optic cable 62 is a ⅜ inch diameter optical glass fiber. Other fiber-optics may be used, such as acrylics, and the diameter may be changed according to the desires and needs of a particular situation. Cable 62 is wrapped with an opaque shield 64 to prevent light from escaping through the sides of the cable, and to protect the outer surface of the cable during use. Cable 62 may be used to pull enclosure 56 about the studio.

Figure 4:
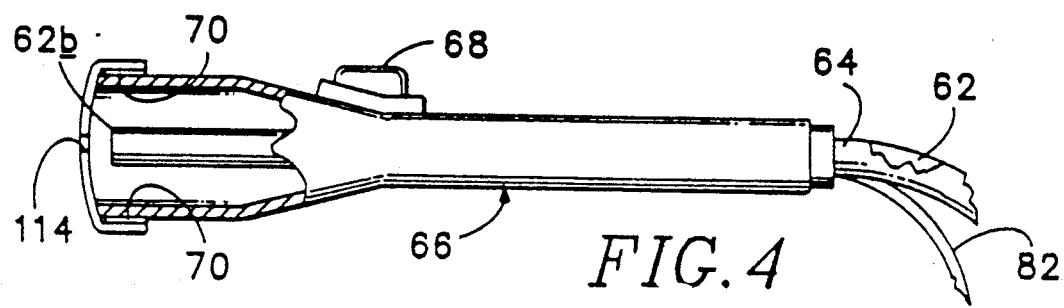
FIG. 4 is a greatly enlarged side elevation of a fiber-optic directing wand of the invention.

Turning momentarily to FIG. 4 and cable-directing wand 66 is depicted having cable 62 extending therethrough. Wand 66 provides a grip at the other end of cable 62 and provides a fixation device for other components of the apparatus. A blade activation switch 68 is carried on wand 66, as is what is referred to herein as attachment means 70, which will be described in more detail later herein.

Figure 3:
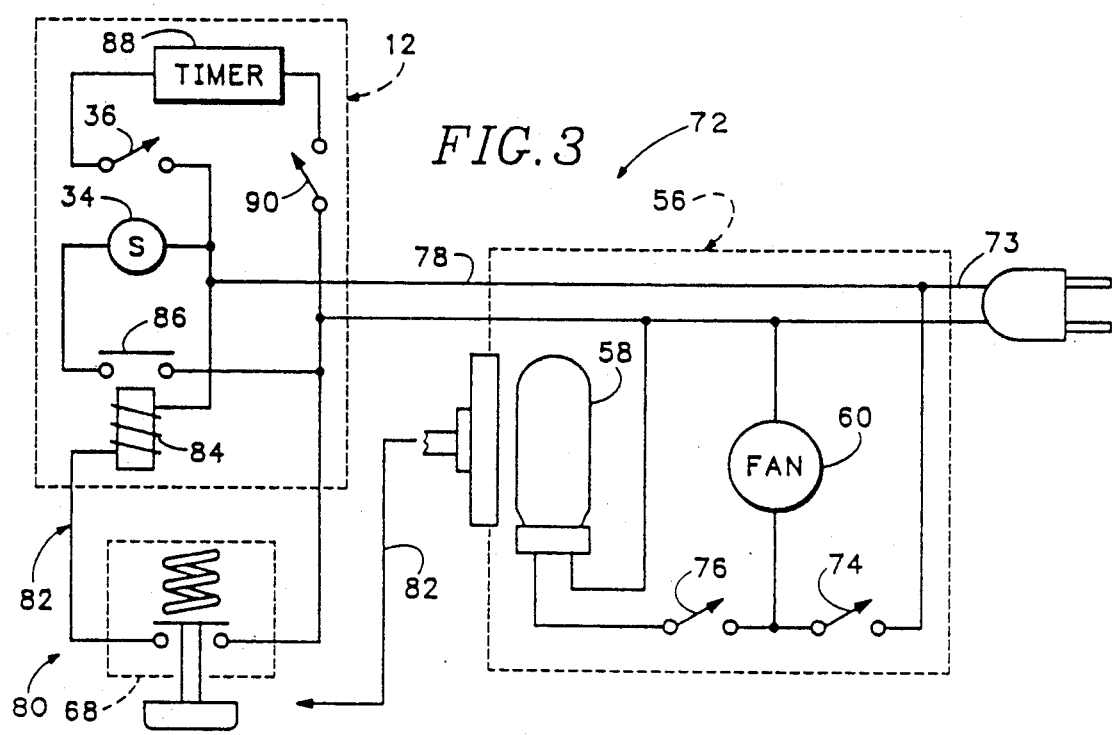
FIG. 3 is a schematic diagram of the electrical circuit of the invention.

Turning now to FIG. 3, an electrical control circuit of the apparatus is depicted generally at 72. Circuit 72 includes a conventional power supply cord and plug 73 which is connected to light-tight enclosure 56. As previously noted, light-tight enclosure 56 includes a light source 58 and a fan 60. A fan switch 74 is operable to turn fan 60 on and a light switch 76 is operable to turn light source 58 on. The circuit is arranged such that light source 58 cannot be turned on unless fan 60 is running. This allows light source 58 to be turned off while fan 60 remains running at the end of a session to cool enclosure 56. Alternately, a heat sensor switch may be used to control fan 60. A cable 78 extends from light-tight enclosure 56 to auxiliary shutter 12. Alternately, of course, auxiliary shutter 12 may have a separate power cord and plug and be completely independent of light-tight enclosure 56.

Auxiliary shutter 12, as previously noted, contains rotary solenoid 34, which is attached to blade 32 and which is connected to power cord 78. A connection circuit 80 is located between blade activation switch 68 and solenoid 34 and includes a cable 82 which extends between auxiliary shutter 12, along fiber-optic cable 62, secured to the outside of sheath 64, and which terminates at blade activation switch 68. In the preferred embodiment, a relay 84 is located in auxiliary shutter 12 and closes a relay switch 86, which activates rotary solenoid 34. In the preferred embodiment, blade activation switch 68 and relay 84 are constructed and arranged to alternately activate and deactivate solenoid 34 in a toggle-like manner, thereby alternately opening and closing window 30 with blade 32. This feature is accomplished by using a latching mechanism on blade activation switch 68 which, when the switch is initially pressed, forms a connection closing relay switch 86, which will remain closed until activation switch is pressed again, thereby unlatching its mechanism and releasing relay 84 and relay switch 86. Blade activation switch 68, motor 34 and connection circuit 80, including relay 84 and relay switch 86, comprise what is referred to herein as blade activation means or activation mechanism. The components in the auxiliary shutter may be operated with low voltage DC if desired, and if suitable voltage/current change mechanisms are provided.

A timer, or timing means, 88 is provided, and includes a mechanism to provide an indication of elapsed exposure time when blade 32 is in its fully withdrawn position, which results in the closure of switch 36. Timer 88 is constructed, in the preferred embodiment, to provide a timing increment of one-second and includes a sound generator for emitting an audible sound, such as a beep at the end of each one-second increment. Such combined timers/sound generators are believed to be well known to skilled in the art. For reason which become apparent later herein, it is important that the photographer know how long window 30 is open for any given exposure. A second switch 90 is provided to deactivate timer 88.

Figure 5:
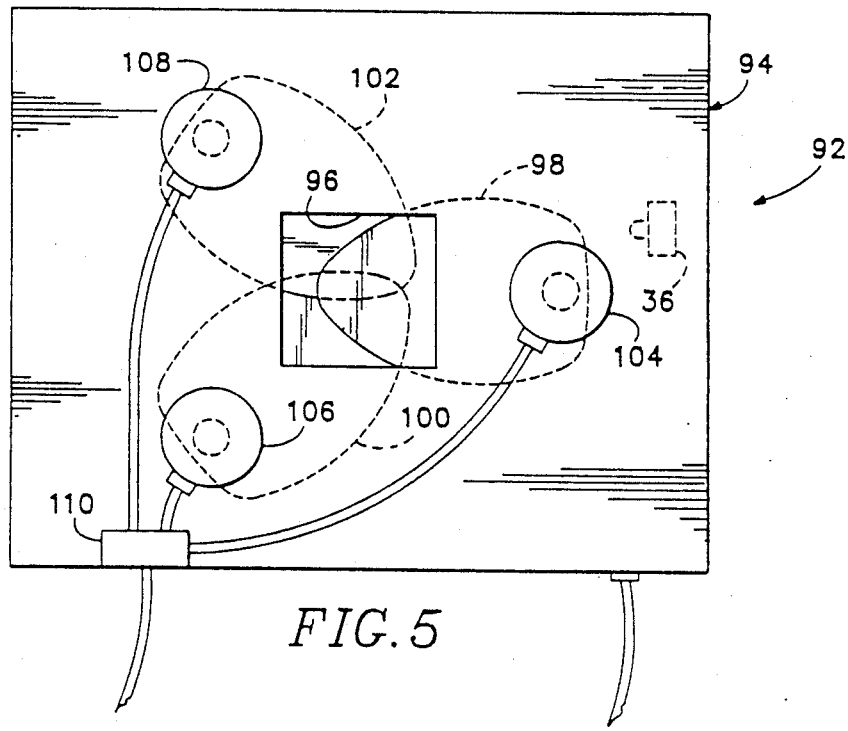
FIG. 5 is an alternate embodiment of an auxiliary shutter of the invention.

Referring now to FIG. 5, an alternate form of the auxiliary shutter is depicted generally at 92. Housing structure 94 is constructed similarly to housing structure 16 and includes a window 96. Blade means in this embodiment includes three leaves 98, 100 and 102. The leaves may be operated with a gear arrangement by a single motor, or, as depicted, may be individually activated by rotary solenoids 104, 106 and 108, all of which are simultaneously activated by a relay and switch 110.

Operation of apparatus 10, incorporating either auxiliary shutter 12 or auxiliary shutter 92 enables a photographer to direct emitted light from end 62b of fiber-optic cable 62 to a desired location on subject 50. With the apparatus and method of the invention, photographs may be created which have a strong resemblance to art work done by an artist using an airbrush in that particular surfaces, curves, angles, etc., may be accentuated or highlighted. This technique is similar to what is referred to as "dodging" during the darkroom processing of a print, in that light is directed to a specific area of what will be the final image to accentuate highlights which would not otherwise be emphasized.

One way to describe the method of the invention is that it is painting with light, much as an artist paints with a brush. To this end, attachment means 70 are provided on wand 66 and allow for the attachment of light-modifying implements, such as that depicted at 112 in FIG. 4. The particular implement depicted includes a very fine slot 114 formed in what is an otherwise opaque substance forming implement 112, which allows a very narrow beam of light to be directed towards the subject. Other implements may be provided which have various geometric shapes formed therein, or which provides a diffusion or translucent cover over the emitting end of wand 66, which are particularly useful when directing the emitted light towards chromed or other highly reflective surfaces. Additionally, wand 66 may be fitted with implements which will polarize or color the emitted light, or, if the emitted light is too intense, provide a neutral density filtering function to the light emitted from wand 66.

As previously noted, the camera, subject and auxiliary shutter are arranged such that the camera has a clear view of the subject. Initially, an exposure of the film in holder 44 is made in a conventional manner by depressing shutter release 42, which activates the shutter in camera 38 and may also simultaneously trigger strobe lights, such as light 54. The initial exposure is calculated to greatly under-expose the film. Various photographic filters, such as filter 116, may be placed over lens 40 during the initial exposure. The initial exposure may be conducted in ambient studio lighting or in complete darkness, depending on the effect which is to be achieved.

Once the initial exposure is made, filter 116 may be removed from the front of lens 40, and if the studio lights have already not been extinguished, the lights are turned out, leaving the studio in complete darkness. The window in the auxiliary shutter is closed and the shutter in camera 38 opened. Light source 58 is activated, causing light to be emitted from end 62b of fiber-optic cable 62. The photographer now has an opportunity to experiment with wand 66, determining how far from the subject the wand should be located to achieve the desired effect. Like a golfer taking a practice swing, the wand may be played over the subject indefinitely so long as window 30 is closed.

When the photographer is ready to expose the film, wand 66 is positioned to properly direct light onto subject 50, and blade activation switch is depressed. This results in relay 84 closing switch 86, thereby activating the rotary solenoid and shifting blade 32 to its fully withdrawn position. This, in turn, closes switch 36, and, provided that second switch 90 is also closed, activates timer 88, which begins emitting audible tones, such as beeps, at one-second intervals. The audible signal provides an indication to the photographer of how long a particular exposure has been going on. Light reflected from the subject passes through window 30, lens 40, and selectively exposes a portion of the film held in film holder 44. At the end of the desired exposure time, blade activation switch 68 is again depressed, thereby unlocking the switch, releasing relay 84 and closing window 30 as blade 32 moves to its fully extended position. This of course releases first switch 36 and eliminates the operation of timer 88 and its integrally located beeper.

The photographer then directs the light to any other portions of the subject which are to be highlighted and repeats the operational sequence of the auxiliary shutter. In some instances, the overall time for making one photograph may be thirty to forty-five minutes, as repeated five to ten second exposures are made of individual parts of the subject. As previously noted, a variety of light-modifying implements may be affixed over the emission end of fiber-optic cable 62 to color the light or otherwise change its characteristics.

All of the components of the exposure control apparatus that are normally visible, are finished in a dark matte finish. In the event that part of the apparatus is actually in the field of view of the camera during film exposure, the apparatus component will not reflect any light which would cause the film to be exposed. The photographer generally wears dark clothing and dark gloves so that no light is reflected off of his body during exposures.

The background of the studio may be uniformly dark, or, if it is not possible or desireable to have such a background, the background may be eliminated from the field of view of the camera by installing a mask over a portion of window 30 to eliminate any part of the field of view which is not desired to be exposed during the selective exposure of the film.

Exposure times must be determined experimentally by each photographer, depending on the desired effect to be created, the speed of the film, lens aperture, etc. Additionally, because the intensity of light is inversely proportional to the square of the distance from the light source to the object being illuminated, a less intense light, and hence, a longer time interval to achieve the same relative exposure of the film is required if the wand is held at a greater distance from the subject than if the wand is held close to the subject.

Thus an apparatus and a method for controlling a photographic exposure have been disclosed. The invention provides for repeated exposures of portions of a light-sensitive film while not inducing movement into the camera support. Repeatable results may be achieved because the photographer knows precisely how long each exposure segment is. Although a preferred embodiment of the invention, and a modification of the auxiliary shutter thereof have been disclosed herein, it should be appreciated that further modifications and variations may be made to the apparatus and method without departing from the scope of the invention as defined in the appended claims.

What is claim is:

1. A photographic exposure control apparatus for selectively exposing, with light reflected from a subject being photographed, portions of a light sensitive film contained in a camera having a lens comprising:
   directable light source means; and
   a free standing auxiliary shutter means located between the camera lens and the subject, the auxiliary shutter means including a housing structure having a window therein, the window being selectively opened and closed by blade means which is movably mounted on the housing structure, the housing structure being operable to block entry of light into the lens when the window is closed and to admit light into the lens when the window is open.

2. The exposure control apparatus of claim 1 wherein the housing structure is a box-like structure and wherein the blade means is contained within the housing structure and which includes motor means for shifting the blade means between a withdrawn position, wherein the window is open, and an extended position wherein the window is closed.

3. The exposure control apparatus of claim 2 wherein the motor means includes a rotary solenoid carried on the housing structure and connected to the blade means.

4. The exposure control apparatus of claim 2 wherein the directable light source includes a switch carried thereon for activating the motor means.

5. The exposure control apparatus of claim 2 wherein further includes a timing means to provide an indication of elapsed exposure time when the blade means is in its withdrawn position.

6. The exposure control apparatus of claim 5 wherein the timing means includes a timing mechanism for timing one-second increments and a sound generator which emits an audible sound at the end of each one-second increment.

7. The exposure control apparatus of claim 1 wherein the directable light source means includes light-tight enclosure having a light source therein, a fiber-optic, light transmitting cable having one end thereof fixed in the enclosure proximal to the light source and extending outwardly from the enclosure, and a fibre-optic directing wand received on the other end of the fibre-optic cable for directing the light which is emitted from the end of the fibre-optic cable.

8. The exposure control apparatus of claim 7 wherein the wand includes attachment means thereon for attaching light-modifying implements thereto for modifying the light which is emitted from the fiber-optic cable.

9. A photographic exposure control apparatus for selectively exposing, with light reflected from a subject being photographed, portions of a light sensitive film contained in a camera having a lens comprising:
a directable light source including a light-tight enclosure having a light source therein, an elongate fiber-optic, light transmitting cable extending from the light source to a cable-directing wand for directing emitted light to a desired location on the subject;
an auxiliary shutter which is positioned between the subject and the lens for selectively allowing passage of emitted, reflected light from the subject to the camera, the auxiliary shutter including a window therethrough and a movable blade for opening and closing the window, the blade being movable between an extended position wherein the window is closed and a withdrawn position wherein the window is open; and
an activation mechanism for remotely operating the blade, the activation mechanism including a switch located on the wand and a motor located on the auxiliary shutter and connected to the blade, and a connection circuit located between the switch and the motor for alternately moving the blade between its extended and withdrawn positions.

10. The exposure control apparatus of claim 9 wherein the auxiliary shutter includes a housing containing the blade therein, with the window extending through the housing, and wherein the motor includes a rotary solenoid mounted on the housing and operably attached to the blade, the connection circuit including a relay located between the switch and the solenoid, the switch and relay being constructed and arranged to alternately activate and deactivate the solenoid in a toggle-like manner thereby to alternately open and close the window.

11. The exposure control apparatus of claim 10 which includes a timing mechanism having a sound generator for generating an audible sound when the window is open.

12. The exposure control apparatus of claim 11 wherein the timing mechanism includes a first switch which is activated by the blade when the blade is fully withdrawn.

13. The exposure control apparatus of claim 9 wherein the directable light source container includes a cooling fan for cooling the light source and casters for allowing free rolling movement of the container.

14. The exposure control apparatus of claim 9 wherein all of the apparatus components which are visible under normal lighting conditions have a dark matte finish thereon to reduce reflection of ambient light therefrom.

15. The exposure control apparatus of claim 9 wherein the wand includes attachment means thereon for attaching light-modifying implements thereto for modifying the light which is emitted from the fiber-optic cable.

16. A photographic exposure control apparatus for selectively exposing, with light reflected from a subject being photographed, portions of a light sensitive film contained in a camera having a lens comprising:
directable light source means including a portable light source contained in a light-tight enclosure, a fiber-optic, light transmitting cable having one end thereof fixed in the enclosure proximal to the light source and extending outwardly from the enclosure, and a fibre-optic directing wand received on the other end of the fibre-optic cable for directing the light which is emitted from the end of the fibre-optic cable;
auxiliary shutter means located between the camera lens and the subject, the auxiliary shutter means including a box-like, generally rectangular housing structure having a window therein, the window being selectively opened and closed by blade means which is movably mounted in the housing structure and which is shiftable between and extended position, wherein the window is closed, and a withdrawn position, wherein the window is open, the housing structure being operable to block entry of light into the lens when the window is closed and to admit light into the lens when the window is open: and
blade activation means for remotely operating the blade, the activation means including a blade activation switch located on the wand and a motor located on the auxiliary shutter means housing structure and connected to the blade, and a connection circuit located between the blade activation switch and the motor for alternately moving the blade between its extended and withdrawn positions.

17. The exposure control apparatus of claim 16 wherein the motor means includes a rotary solenoid carried on the housing structure and connected to the blade means.

18. The exposure control apparatus of claim 17 wherein the connection circuit includes a relay located between the blade activation switch and the solenoid, the blade activation switch and relay being constructed and arranged to alternately activate and deactivate the solenoid in a toggle-like manner thereby to alternately open and close the window.

19. The exposure control apparatus of claim 16 which further includes a timing means to provide an indication of elapsed exposure time when the blade means is in its withdrawn position, wherein the timing means includes a timing mechanism for timing one-second increments and a sound generator which emits an audible sound at the end of each one-second increment.

20. The exposure control apparatus of claim 16 wherein the timing mechanism includes a first switch which is activated by the blade when the blade is fully withdrawn, and a second switch for deactivating the timing mechanism.

21. The exposure control apparatus of claim 16 wherein the wand includes attachment means thereon for attaching light-modifying implements thereto for modifying the light which is emitted from the fiber-optic cable.

22. A method of controlling a photographic exposure comprising:

positioning a subject and a film-containing camera;
under-exposing an image of the subject on the film;
positioning an auxiliary shutter between the subject and the camera, with the auxiliary shutter in a closed condition;
darkening the environment containing the subject and the camera;
providing an emitted light beam which may be directed towards the subject using a light source and a fiber-optic cable which has an auxiliary-shutter control button located thereon;
directing the emitted light beam at the subject;
opening the auxiliary shutter for a predetermined time interval with the emitted light beam directed at a particular portion of the subject; and
closing the auxiliary shutter with the auxiliary-shutter control button at the end of the predetermined time interval.

23. The method of claim 22 which includes changing the nature of the emitted light by providing a light-modifying implement over the emitting end of the fiber-optic cable.

* * * * *